(12) United States Patent
Akhund et al.

(10) Patent No.: US 9,995,819 B1
(45) Date of Patent: Jun. 12, 2018

(54) SYSTEM AND METHOD FOR SPHERICAL OBJECT IDENTIFICATION USING RADAR

(71) Applicant: Lockheed Martin Corporation, Bethesda, MD (US)

(72) Inventors: Yusif K. Akhund, Mount Laurel, NJ (US); Felice DiAntonio, Barrington, NJ (US); Daniel J. Barrot, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 308 days.

(21) Appl. No.: 14/851,725

(22) Filed: Sep. 11, 2015

(51) Int. Cl.
*G01S 7/41* (2006.01)
*G01S 7/292* (2006.01)

(52) U.S. Cl.
CPC .............. *G01S 7/414* (2013.01); *G01S 7/292* (2013.01); *G01S 7/411* (2013.01); *G01S 7/418* (2013.01)

(58) Field of Classification Search
CPC .................. G01S 7/41–7/418; G01S 7/292
See application file for complete search history.

(56) References Cited

U.S. PATENT DOCUMENTS 9,261,583 B2 * 2/2016 Balaji .................... G01S 7/025

* cited by examiner

*Primary Examiner* — Matthew M Barker
(74) *Attorney, Agent, or Firm* — Howard IP Law Group, PC

(57) ABSTRACT

A computer-implemented method for processing radar return signals to identify spherical objects from within a cluster of objects, collects by a radar receiver, a plurality of radar return signals over N-point measurement windows corresponding to objects within the cluster of objects, the radar return signals corresponding to electronic pulses transmitted by a radar transmitter. The radar processor extracts radar cross section data from the collected plurality of radar return signals, and computes, based on the radar cross section data, a plurality of standard deviation values, each standard deviation value based on the radar cross section data corresponding to one of the N-point windows. The radar processor determines, based on analysis of the sequence of standard deviation values of the return signals, whether the object is a spherical object.

20 Claims, 8 Drawing Sheets

SYSTEM AND METHOD FOR SPHERICAL OBJECT IDENTIFICATION USING RADAR

FIELD OF THE INVENTION

The present invention relates to signal processing systems and methods for use in radar applications, and more particularly, to systems and methods for detecting spherical objects from within a cluster of objects with more complex shape through return data received by radar systems.

BACKGROUND

Radar systems are useful for detecting, characterizing and monitoring various parameters associated with natural and/or man-made objects and are critical to both civilian and military operations. These systems typically transmit "beams" or electromagnetic (EM) signals intended to engage one or more objects or targets, and process reflected return signals (or echoes) for measuring spatial features, object identification and characterization. A radar echo return usually contains both signals generated from a desired target, as well as background clutter.

Certain environments are complicated by intentional deception methods designed to distract radar systems from an object or objects of interest. One such tactic is to flood the target scene with simple point-targets (also known as traffic decoys) to mask other more complex objects and/or pull off the radar's track beam away these objects, thus decreasing radar performance by hindering the system's ability to detect and track true targets in the presence of undesirable (which may also be known as false) target detections. Several aspects of a radar tracking system may be impacted in a variety of ways by such decoys. For example, depending on the proximity of the point-target(s) to the true target, proper construction of the true target response may be difficult, resulting in corrupt measurements that will be used downstream in order to make decisions about the objects being tracked, and subsequently how to allocate resources in the future.

Thus, the presence of traffic decoys may impact many different radar system functions. For example, the traffic decoys may affect radar system detection capability, as traffic decoys in close proximity to true targets may corrupt measurement values of true targets, affecting Tracking and Discrimination, and traffic decoys in close proximity to one another may generate measurement values representative of complex targets, affecting Tracking and Discrimination. In addition, the traffic decoys may affect radar system tracking functions, as Traffic decoy detections may be incorrectly correlated to true object tracks, resulting in measurement history corruption and/or causing true object tracks to exhibit kinematic behavior uncharacteristic of the true object. In addition, the traffic decoys may cause track steals, resulting in the loss or corruption of measurement history. Traffic decoys may also affect radar discrimination, as the presence of tracks on point scatters may result in misclassifying the true target as "non-true target" (leakage), and the presence of tracks on point scatters may result in misclassifying the point scatterers as "true target" (false alarms).

The presence of traffic decoys may also affect radar resource utilization and defense functions. With regard to radar resources, the traffic decoys may cause the radar system to incur additional beam shape losses, due to degraded ability to center beam on true target. In addition, traffic decoys may cause the need for additional radar resources by requiring beams on additional targets, and furthermore, the decoys may cause the need for additional or upgraded hardware for the system to process additional detections. With regard to defense functions, traffic decoys may cause an increased miss distance of interceptors, due to incorrect targeting, and may forces a defender to use additional interceptor inventory/more advanced designs (see KEI) to destroy expendable targets. In addition, the traffic decoys may force defenders to employ layered defenses to protect high value targets, and may mislead human-operated defenses, causing them to focus resources on expendable targets.

In the event of the deployment of decoy targets, an approach to screen out large quantities of undesirable point targets, i.e. spheres, in the presence of complex targets is desired. Several methods exist which attempt to discriminate between point targets and non-point targets. One such method takes advantage of the fact that spheres reflect the same response to transmitted pulses regardless of the incident polarization. This can be exploited with a radar system employing dual polarization, e.g. transmitting with linearly-polarized RF waves in the vertical direction and receiving in the horizontal. This would result in perfect cancellation for an ideal point target, while preserving the radar return for objects with complex scattering. However, this requires a radar system capable of dual polarization on transmit and receive, which can be a costly upgrade to the hardware if not already available.

A more simple and affordable approach using only available radar return data is desired for broader applicability to current radar platforms.

SUMMARY

In one embodiment of the present disclosure, a radar system is provided. The system includes a transmitter configured to generate a series of electromagnetic pulses, and a receiver configured to receive reflected return signals generated by an object of interest from the series of electromagnetic pulses. A signal processor is operatively connected to the output of the receiver and configured to extract Radar Cross Section (RCS) data as a function of time from the received return signals, compute statistics on sequences of RCS measurements, and run these sequences through a novel process to positively identify an object's shape as spherical.

In an embodiment, a computerized radar system for processing a plurality of radar return signals to identify spherical objects from within a cluster of objects may comprise a radar receiver for receiving the plurality of radar return signals corresponding to electronic pulses transmitted by a radar transmitter and a radar processor coupled to the radar transmitter and the radar receiver. The radar processor may be configured to: collect the plurality of radar return signals corresponding to an object within the cluster of objects; extract radar cross section data from the collected plurality of radar return signals over a plurality of N-point sliding windows; compute, based on the radar cross section data, a plurality of standard deviation values, each standard deviation value based on the radar cross section data corresponding to one of the plurality of N-point sliding windows; and determine, based on analysis of the plurality of standard deviation values of the plurality of radar return signals, whether the object is a spherical object. The radar processor being configured to determine, based on analysis of the plurality of standard deviation values of the plurality of radar return signals, whether the object is a spherical object may comprise the radar processor being configured to determine whether at least a pre-determined number of the plurality of standard deviation values of the plurality of radar return signals are below a predetermined standard deviation threshold value. In an embodiment, the predetermined standard deviation threshold value is 1.5 dBsm.

The radar processor being configured to determine whether a pre-determined number of the plurality of standard deviation values of the plurality of radar return signals are below the predetermined standard deviation threshold value may comprise the radar processor being configured to: determine a number of the plurality of standard deviation values that are below the predetermined standard deviation threshold value; compare the number of the plurality of standard deviation values that are below the predetermined standard deviation threshold value to a predetermined desired number of standard deviation values below the predetermined standard deviation threshold value; and responsive to a determination that the number of the plurality of standard deviation values that are below the predetermined standard deviation threshold value is greater than the predetermined desired number of standard deviation values, determine that the object is a spherical object.

The radar processor being configured to compare the number of the plurality of standard deviation values that are below the predetermined standard deviation threshold value to the predetermined desired number of standard deviation values below the predetermined standard deviation threshold value may comprise the radar processor being configured to compare the number of the plurality of standard deviation values that are below the predetermined standard deviation threshold value to the predetermined desired number of standard deviation values below the predetermined standard deviation threshold value. Responsive to a determination that the number of the plurality of standard deviation values that are below the predetermined standard deviation threshold value is greater than the predetermined desired number of standard deviation values, the radar processor may be configured to: increment a counter value and compare the counter value to a predetermined threshold counter value. Responsive to a determination that the counter value is greater than the predetermined threshold counter value, the radar processor may be configured to determine that the object is a spherical object. In an embodiment, the predetermined threshold counter value is 3. The predetermined standard deviation threshold value may be 1.5 dBsm. The predetermined desired number of standard deviation values may be 5.

A computer-implemented method for processing a plurality of radar return signals to identify spherical objects from within a cluster of objects may comprise: collecting, by a radar receiver, the plurality of radar return signals corresponding to an object within the cluster of objects, the radar return signals corresponding to electronic pulses transmitted by a radar transmitter; extracting, by a radar processor, radar cross section data from the collected plurality of radar return signals over a plurality of N-point sliding windows; computing, by the radar processor based on the radar cross section data, a plurality of standard deviation values, each standard deviation value based on the radar cross section data corresponding to one of the plurality of N-point sliding windows; and determining, by the radar processor based on analysis of the plurality of standard deviation values of the plurality of radar return signals, whether the object is a spherical object. Determining whether the object is a spherical object based on analysis of the plurality of standard deviation values of the plurality of radar return signals may comprise determining whether at least a pre-determined number of the plurality of standard deviation values of the plurality of radar return signals are below a predetermined standard deviation threshold value. In an embodiment, the predetermined standard deviation threshold value is 1.5 dBsm.

In the computer-implemented method, determining whether a pre-determined number of the plurality of standard deviation values of the plurality of radar return signals are below the predetermined standard deviation threshold value may comprise: determining a number of the plurality of standard deviation values that are below the predetermined standard deviation threshold value; comparing the number of the plurality of standard deviation values that are below the predetermined standard deviation threshold value to a predetermined desired number of standard deviation values below the predetermined standard deviation threshold value; and responsive to a determination that the number of the plurality of standard deviation values that are below the predetermined standard deviation threshold value is greater than the predetermined desired number of standard deviation values, determining that the object is a spherical object.

Comparing the number of the plurality of standard deviation values that are below the predetermined standard deviation threshold value to the predetermined desired number of standard deviation values below the predetermined standard deviation threshold value may comprise comparing the number of the plurality of standard deviation values that are below the predetermined standard deviation threshold value to the predetermined desired number of standard deviation values below the predetermined standard deviation threshold value. Responsive to a determination that the number of the plurality of standard deviation values that are below the predetermined standard deviation threshold value is greater than the predetermined desired number of standard deviation values, the method may be configured to increment a counter value and compare the counter value to a predetermined counter threshold. Responsive to a determination that the counter value is greater than the predetermined counter threshold, the method may determine that the object is a spherical object.

In an embodiment, the predetermined counter threshold may be 3. The predetermined standard deviation threshold value may be 1.5 dBsm. The predetermined desired number of standard deviation values may be 5.

A computer-implemented method for detecting and identifying spherical objects from within a cluster of objects may comprise: (a) transmitting, by a transmitter, electromagnetic pulses to track an object; (b) receiving, by a receiver, a plurality of return signals corresponding to the electromagnetic pulses and extracting radar cross section (RCS) measurements from the plurality of received return signals; (c) computing, by a radar processor, a predetermined number of RCS standard deviation values from an N-point sliding window corresponding to the plurality of return signals; (d) determining, by the radar processor, a number of the RCS standard deviation values that are below a predetermined standard deviation threshold value in a non-overlapping window of predetermined size; and (e) comparing, by the radar processor, the number of the RCS standard deviation values that are below the predetermined standard deviation threshold value to a predetermined desired number of standard deviation values below the predetermined standard deviation threshold value. In step (f), responsive to a determination that the number of the RCS standard deviation values that are below the predetermined standard deviation threshold value is less than the predetermined desired number of standard deviation values below the predetermined standard deviation threshold value, the method may repeat, by the radar processor, steps (a) through (e) until the number of the RCS standard deviation values that are below the predetermined standard deviation threshold value is greater than the predetermined desired number of standard deviation values below the predetermined standard deviation threshold value. In step (g), responsive to a determination that the number of the RCS standard deviation values that are below the predetermined standard deviation threshold value is greater than the predetermined desired number of standard deviation values below the predetermined standard deviation threshold value, the method may include (h) incrementing, by the radar processor, a counter to generate a counter value; (i) comparing, by the radar processor, the counter value to a predetermined threshold counter value; (j) responsive to a determination that the counter value is less than the predetermined threshold counter value, repeating, by the radar processor, steps (a) through (i) until the counter value is greater than the predetermined threshold counter value; and (k) responsive to a determination that the counter value is greater than the predetermined threshold counter value, outputting, by the radar processor, a determination that the object being tracked is a spherical object.

In an embodiment, computing, by the radar processor, the predetermined number of RCS standard deviation values from the N-point sliding windows corresponding to the plurality of return signals, may comprise: (l) collecting the plurality of return signals corresponding to the object; (m) extracting radar cross section data from the plurality of received return signals over the N-point sliding window; (n) computing a standard deviation value based on the plurality of radar return signals corresponding to the N-point sliding window; (o) determining whether a predetermined minimum number of standard deviations values have been computed; and (p) responsive to a determination that the predetermined minimum number of standard deviation values have not been computed, repeating steps (l) through (o) until the predetermined minimum number of standard deviations values have been computed. The N-point sliding window may comprise a twenty-point sliding window. The non-overlapping window of predetermined size may comprise a window of nine standard deviation values.

DETAILED DESCRIPTION

Figure 1:
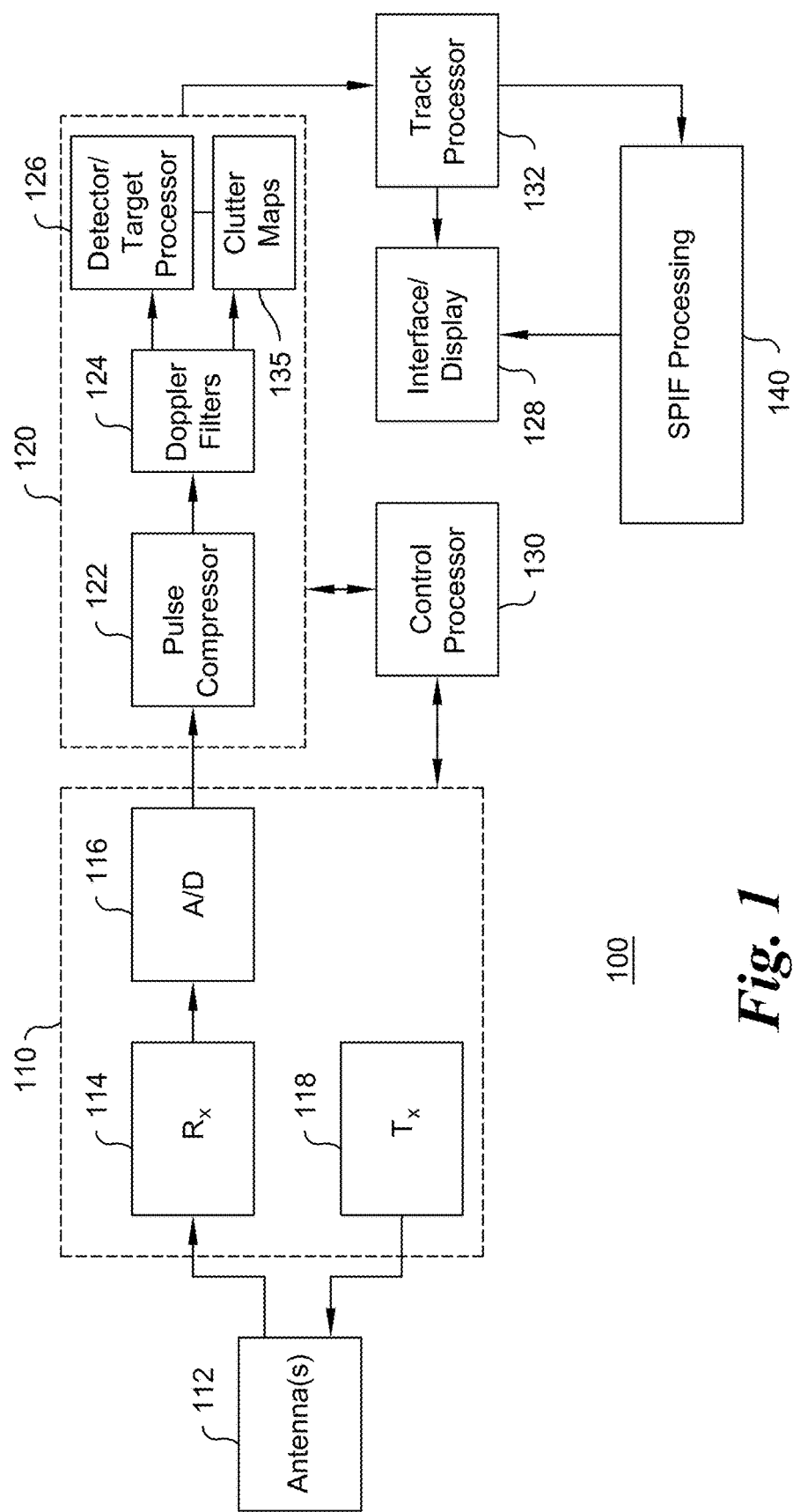
FIG. 1 is a simplified block diagram of a radar and signal processing system according to an embodiment of the present disclosure.

It is to be understood that the figures and descriptions of the present invention have been simplified to illustrate elements that are relevant for a clear understanding of the present invention, while eliminating, for purposes of clarity, many other elements found in typical remote sensing systems, such as pulse and pulse-Doppler radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Processes according to embodiments of the present disclosure may analyze the characteristics of radar return signals passed through a signal processor in order to positively identify spherical objects. In one embodiment, a radar system is provided for generating a "dwell" of RF energy, i.e. a single pulse or sequence of pulses, with transmit frequency diversity between consecutive dwells across the radar operating band. Received reflected return signals are processed through a receiver. This processing may include, but is not limited to, Doppler filtering, integration over pulses, and subsequent target detection processing based on the return signal data. Target detection processing may be performed by identifying discrete amplitude peaks in the return signal above a threshold designed to minimize false detections from radar sidelobes and the background noise level. Known processes for target detection processing may be used. In embodiments of the present disclosure, the RCS may be measured and converted to log space (measured in decibels, dB) for each object detection for use in the Sphere Indicator Function (SPIF) process. Conversion to log space may not be necessary in other embodiments.

Return pulses associated with an identified target may be time-aligned, and known phase changes or offsets (i.e. measured velocity indicated by a measured Doppler shift) may be corrected by the time delay for each pulse to reflect from the target, prior to detection processing according to embodiments of the present disclosure, if using multi-pulse transmit dwells. This may be achieved by, for example, using range and range rate estimates from the Doppler-based detection processing as described, along with range acceleration estimates to correct for Doppler shifts in pulse compressed data. In this way, the return signals may be integrated either coherently (i.e. taking phase into account) or non-coherently (i.e. using amplitude only) and the detection process and RCS estimation are performed on the integrated range profile. If using single-pulse dwells, the detection process may be performed directly on the amplitude of the single pulse response. In a subsequent step, tracks may be formed from a series of detections and RCS measurements may be correlated to tracks to form a time sequence of RCS measurements for each track. The SPIF process operates on these RCS sequences and returns a result for each object in track.

Generally speaking, the radar cross-section of a target is a measure of the proportion of incident energy transmitted by a radar towards the target that is subsequently returned or scattered back in the direction of the radar. It is frequently defined in the context of the radar range equation:

$$\sigma = 4\Pi r^2 \frac{|E_S|^2}{|E_i|^2} \quad (1)$$

where r is the range to the target, $E_i$ and $E_s$ are the incident and scattered electric fields at the target, respectively, and the electric field itself is proportional to $$e^{\frac{2\pi i}{\lambda}(r-ct)},$$

where c is the speed of light and $\lambda$ is the wavelength. Rigorous calculation of radar cross-section requires solving Maxwell's electromagnetic equations.

Radar cross-section depends on many factors, including but not strictly limited to the physical size, shape and material properties of the target, the viewing geometry between the radar and the target, and the wavelength of the incident radiation relative to the target dimensions.

Figure 2:
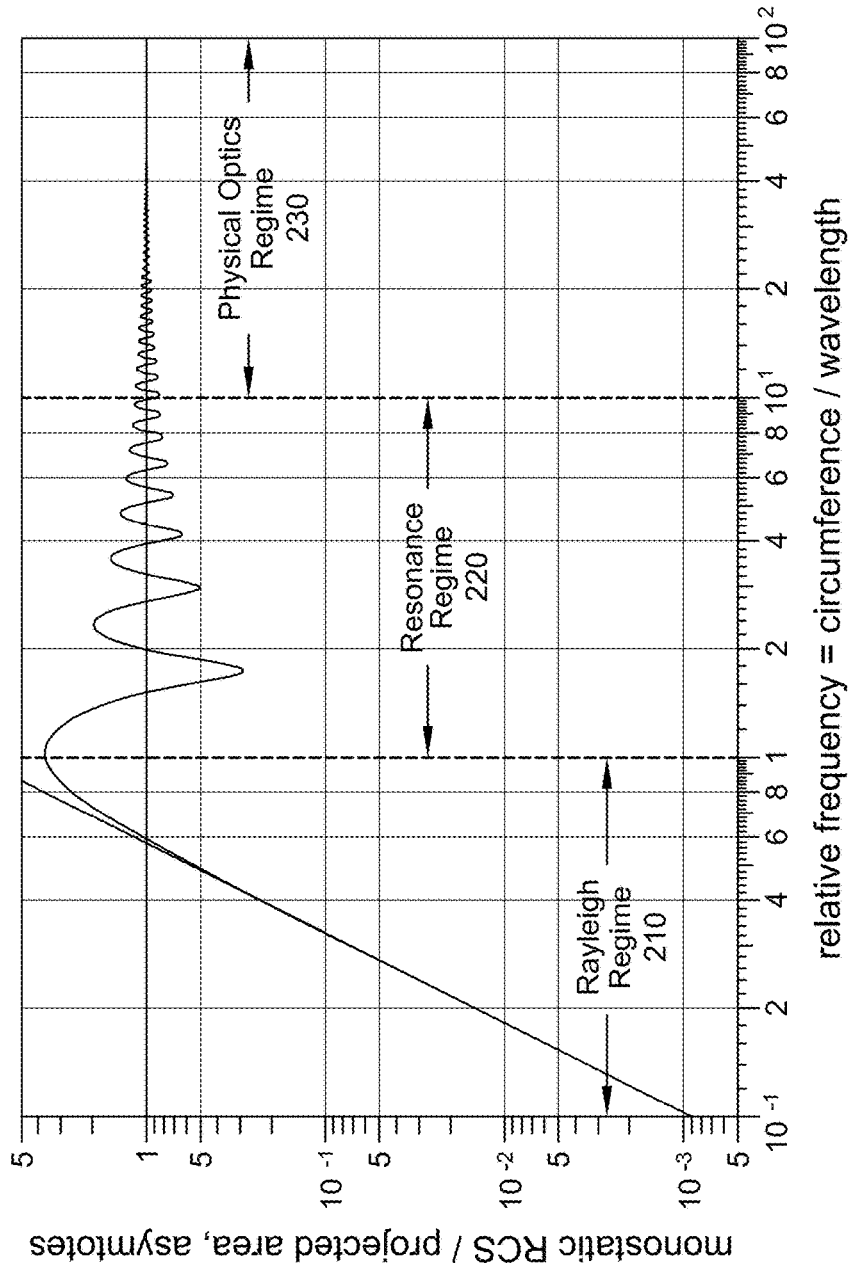
FIG. 2 is a graphical illustration of monostatic Radar Cross Section for a metal sphere as a function of size and the incident RF wavelength

The relationship between radar wavelength and target dimensions can be divided into three characteristic scattering regions: the Rayleigh region where the wavelength is larger than the dimensions of the target, the Resonance region where the wavelength is of the same order as the dimensions of the target, and the Physical optics region where the wavelength is smaller than the dimensions of the target. The general characteristic of the radar cross-section of a sphere is illustrated in FIG. 2 for each of these three scattering regions. It is expected that the process which is the subject of this application will show maximum utility in the Physical optics regime where the cross-section of a sphere will be unperturbed by small changes in wavelength.

Other objects that are expected to be of interest to a radar in the context of spherical balloons include large objects possessing cylindrical, conical, or other complex shapes. Typically, these objects are made by combining many physical segments into one electrically discontinuous extended object due to segment joints, bands, rivets, and varying material properties. The scattered electric field, being the complex sum of the scattering from each of these discontinuities (Physical Optics regime) will vary significantly as a function of wavelength as the individual scattering sources sum either constructively or destructively. Hence, in contrast to a spherical target, complex and extended targets of interest are generally expected to have significant variation in radar cross-section as a function of wavelength, and this variability enhances the utility of the proposed process in practical applications using frequency-diverse waveforms.

As noted, simple point-targets (also known as traffic decoys) may be deployed to hinder a radar system's ability to detect and track true targets in the presence of undesirable target detections. Several aspects of a radar tracking system may be impacted in a variety of ways by such decoys. For example, depending on the proximity of the point-target(s) to the true target, proper construction of the true target response may be difficult, resulting in corrupt measurements that will be used downstream in order to make decisions about the objects being tracked, and subsequently how to allocate resources in the future. The presence of traffic decoys may impact many different radar system functions, such as radar system detection capability, radar system tracking functions, track steals, radar discrimination, and radar resource utilization and defense functions.

While the Sphere Indicator Function (SPIF) of the present disclosure operates on track measurements and, therefore, cannot directly influence Detection and Tracking, it can benefit Discrimination by reducing the amount of false alarms (i.e., undesirable alarms associated with decoys) and leakage that occur, resulting in better usage of available resources and indirectly benefitting Detection and Tracking on subsequent dwells, by allowing the system to either screen out likely point scatterer objects or by removing tracks on previously identified point scatterers from future consideration altogether. In this way, the SPIF process is able to mitigate the impact of traffic decoys on a radar system that employs the process, without resorting to more costly and technically challenging hardware solutions such as dual-polarization or wideband imaging.

Referring generally to FIG. 1, embodiments of the present disclosure will be described herein as implemented into an exemplary sphere indicator system. As will be understood by one of ordinary skill in the art, a radar system 100 may comprise a front-end module 110, including a transmitter 118 responsive to a radar control processor 130 for generating and transmitting a series of defined waveforms from an antenna 112. As set forth above, these waveforms may take the form of signal dwells comprising a plurality of frequency-diverse EM pulses. Reflected return signals from each dwell are subsequently captured by antenna 112 and provided to at least one receiver 114 for signal modulation. Receiver 114 may include various processing components, such as one or more filters, a low-noise amplifier and a down converter, as will be understood by one of ordinary skill in the art. At least one analog to digital converter (ADC) 116 may be provided for converting received analog return signals to digital form. A duplexer or switching element (not shown) may also be provided for disconnecting transmitter 118 to establish a path to the receiver 114 between transmission and reception operations. Control processor 130 may be configured to control the functionality of the above-described embodiments. For example, control processor 130 may be used to control the on and off timing of the receiver/ADC 114, 116. Moreover, control processor 130 may be responsive to the transmitter for correlating a given transmitter output pulse and received return pulse, on a pulse-by-pulse basis within a coherent interval.

System 100 may also include, by way of non-limiting example, a digital processing system 120, including a pulse compression module 122 operative to receive post-A/D digitized in-phase and quadrature-phase (I/Q) signal data from front end module 110. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

The output of pulse compression module 122 comprises modulated data which may be subject to further processing, such as sampling the incoming data into range cells or bins, and generating one sample in each range bin for each pulse. Range bin data can then be provided to Doppler filters 124 which generate a series of Doppler bins for each range cell. Data from a particular Doppler bin corresponds to a signal from a target or background, at a given range, moving at a particular speed. Once Doppler-filtered, return data is provided to a detection processor 126 operative to, for example, perform a target detection process against a time-averaged background map 135. These detection processes may include one or more of "greatest of" operations, as well as constant false alarm rate (CFAR) processing by comparing the powers of each range/Doppler cell to a background clutter map (e.g. clutter maps 135). Finally, the results of detection processing may be provided to a Track Processor 132 to initiate discrete track segments, correlate measured detections to tracks, and perform track filtering. These track segments are intended to represent a radar system's best estimate of a true object's state (e.g. position, velocity, acceleration) at a given point in time. As will be understood by one of ordinary skill in the art, there are many techniques for performing this processing such as Kalman filtering. The results of this detection and track processing may be provided to a display device 128 for end-user interfacing.

Still referring to FIG. 1, in one exemplary embodiment, after initial target detection and track processing has taken place, return data associated with an identified target may be provided to a Sphere Indicator Function (SPIF) processor 140 for processing operations according to embodiments of the present disclosure. As the embodiments of the present disclosure describe, the SPIF processor 140 may process return signal data associated with a detected target (or suspected target) to determine whether the detected target is a sphere. While the SPIF processor 140 is shown as a separate processor in FIG. 1, in other embodiments the SPIF processor 140 may be integral to control processor 130. For example, in such an embodiment, the output of digital processing system 120 may be routed to control processor/SPIF processor 130, which may then process the data to determine whether the target is a sphere.

FIG. 2 is a graphical illustration 200 of a monostatic Radar Cross Section for a metal sphere as a function of size and the incident RF wavelength. As shown in FIG. 2, the relationship between radar wavelength and target dimensions can be divided into three characteristic scattering regions: the Rayleigh region 210 where the wavelength is larger than the dimensions of the target, the Resonance region 220 where the wavelength is of the same order as the dimensions of the target, and the Physical optics region 230 where the wavelength is smaller than the dimensions of the target.

Figure 3:
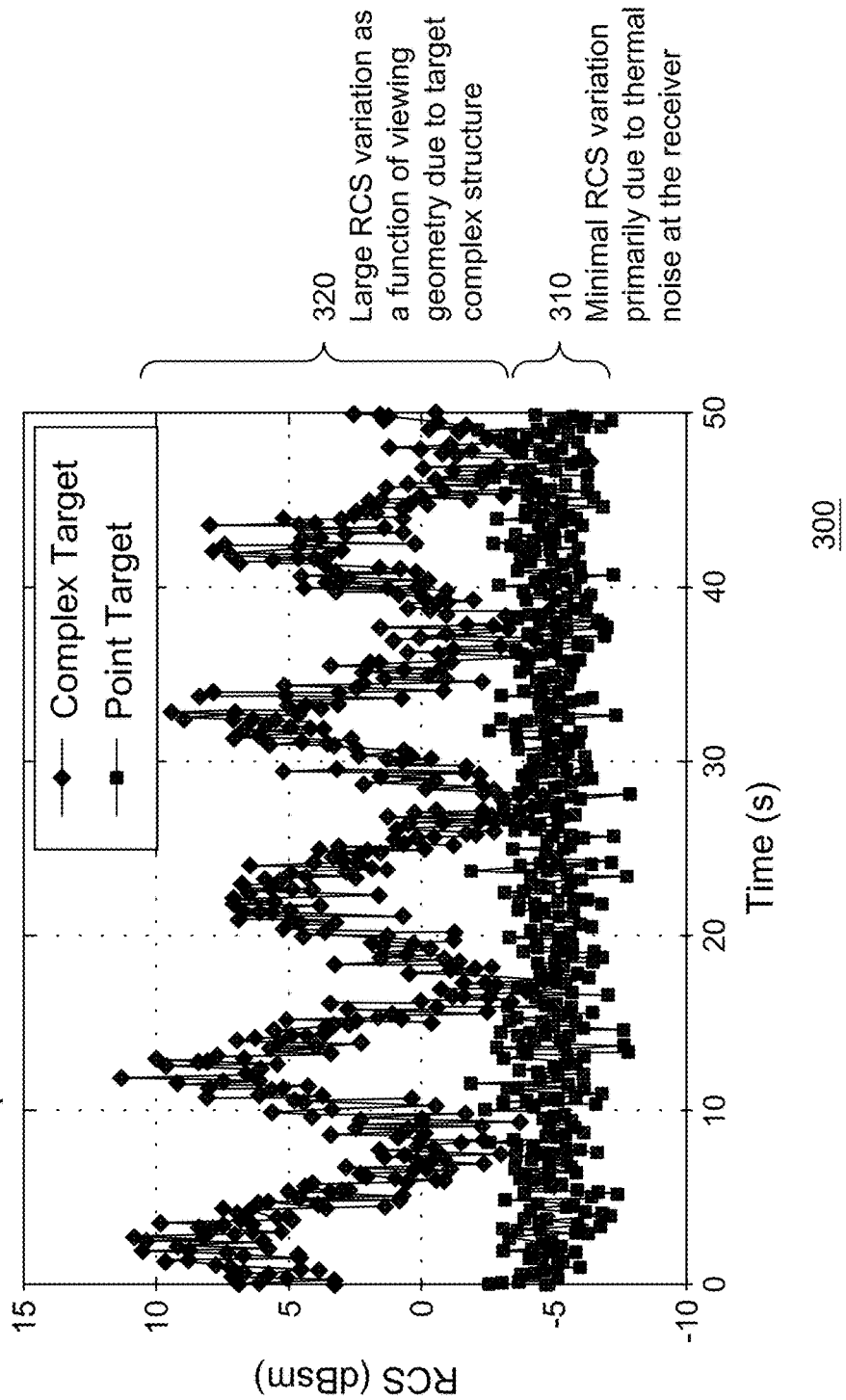
FIG. 3 is a graphical illustration of exemplary RCS responses of spherical and non-spherical complex objects in varying dynamic states.

FIG. 3 is a graphical illustration 300 of an exemplary radar cross section (RCS) response of a spherical object 310 and an exemplary RCS response of a non-spherical complex target 320. As shown, the non-spherical complex object RCS response 320 has a large RCS variation, as a function of viewing geometry and/or incident transmit frequency of the radar due to the object's complex structure. In contrast, the spherical object RCS response 310 has minimal RCS variation over the same length of time because the spherical objects have a roughly constant RCS regardless of viewing geometry and transmit frequency. To the extent that RCS variation is observed in relation to spherical objects, that variation has typically been observed to be due to thermal noise at the receiver.

Figure 4:
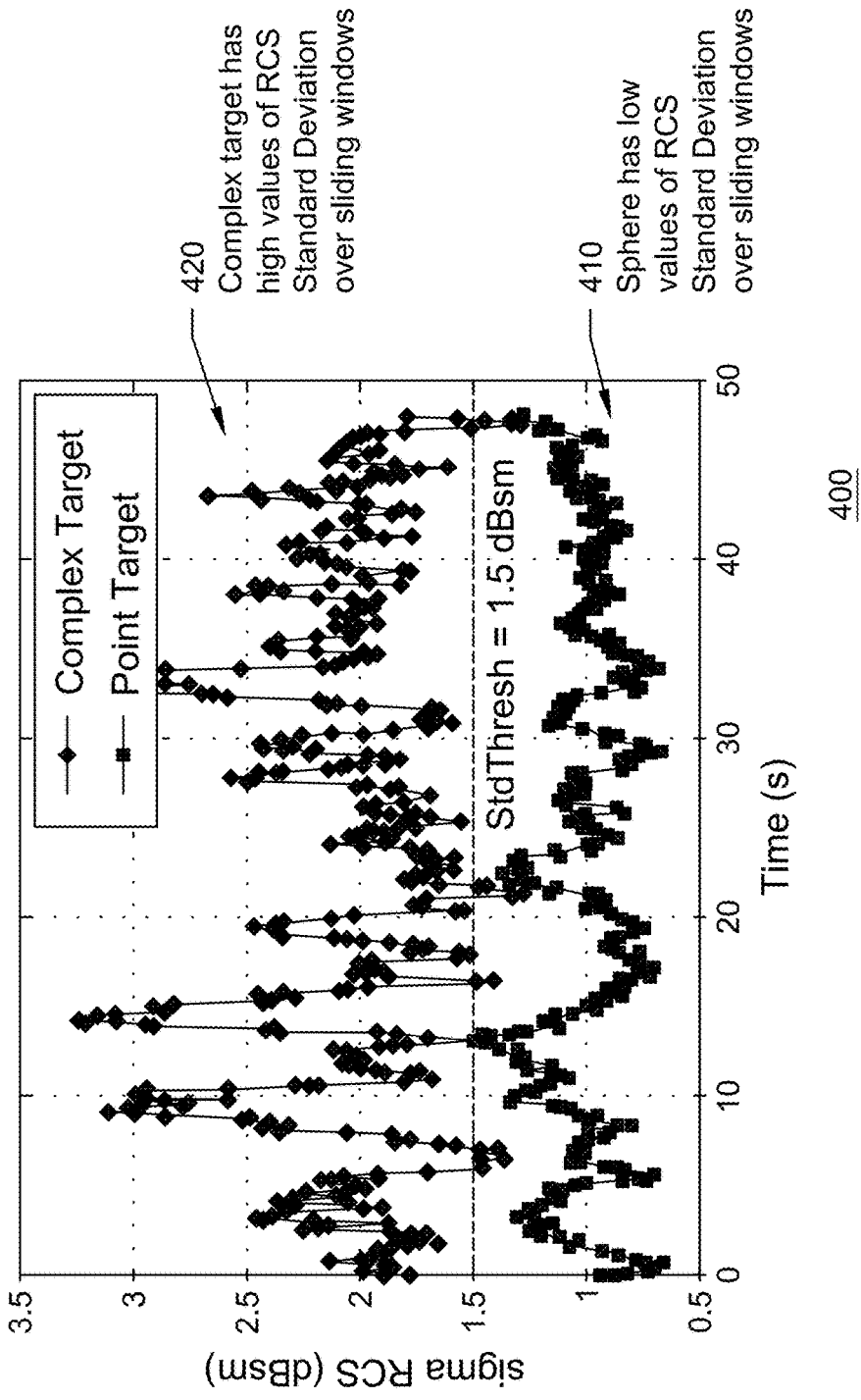
FIG. 4 is a graphical illustration of exemplary RCS Standard Deviation sequences of spherical and non-spherical complex objects in varying dynamic states.

FIG. 4 is a graphical illustration 400 of exemplary RCS Standard Deviation sequences over 20-point sliding windows (i.e., N=20) of spherical and non-spherical complex objects in varying dynamic states. As shown, the complex object RCS standard deviation sequences 420 have high values of RCS standard deviation over the sliding windows, due to the object's complex structure. In contrast, the spherical objection standard deviation sequences 410 have low values of RCS standard deviation over the sliding windows, due to the spherical shape of the object.

A process may be specified to detect and/or identify spherical objects which leverages the RCS responses observed in FIG. 3 and the RCS standard deviation sequences observed in FIG. 4.

Figure 5:
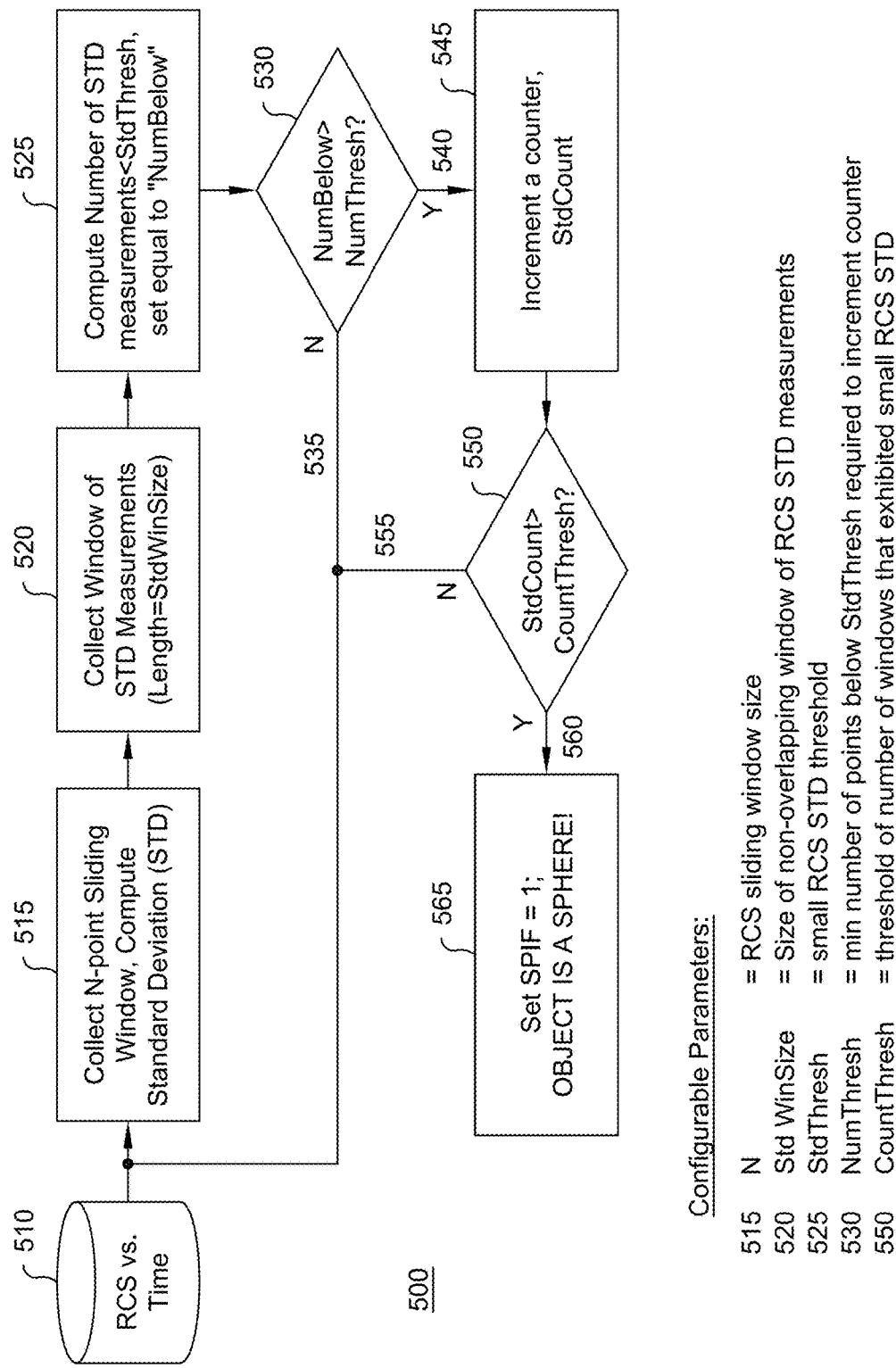
FIG. 5 is a process flow diagram illustrating a Sphere Indicator Function (SPIF) process according to an embodiment of the present disclosure.

FIG. 5 is one embodiment of a SPIF process flow 500 which receives sequences of RCS measurements using a radar with frequency-diverse transmit waveforms for a given object to identify spherical objects according to the present disclosure. At block 510, a radar receiver collects radar return signals over time. At block 515, radar return signals corresponding to an N-point window are collected. In an embodiment, the N-point sliding window may comprise a twenty-point sliding window. Radar cross section data is extracted, by a radar processor, from the radar return signals, and then the radar processor computes a standard deviation value based on the return signals corresponding to the N-point sliding window. The value of N may be chosen to sufficiently sample the RCS variation due to 1) frequency variation of the incident transmitted waveform and 2) a change in target viewing geometry over the N points. At block 520, the radar processor collects a window corresponding to non-overlapping windows of standard deviation values received from block 515, the window of block 520 comprising a predetermined minimum number of standard deviations values. In an embodiment, a non-overlapping window of a predetermined size or minimum number of standard deviations values may be set based on empirical analysis, and may be represented by StdWinSize. In an embodiment, the non-overlapping window of predetermined size may comprise a window of nine standard deviation values.

If, at block 520, a determination is made that the predetermined minimum number of standard deviations values, StdWinSize, have not been computed, additional standard deviations corresponding to additional N-point sliding windows are collected from block 515 until the predetermined minimum number of standard deviations values have been computed. Thus, responsive to a determination that the predetermined minimum number of standard deviation values have not been computed, the radar processor effectively causes the process to go back to block 515, where the radar processor slides the window to collect return signals corresponding to the object over a N-point sliding window, extracts the radar cross section data from the return signals, computes a standard deviation for the window, and feeds that value to block 520. An N-point sliding window of RCS measurements is collected and the standard deviation (STD) is computed over the N points. A new STD is recorded on each new track update, as the RCS window slides. In this manner, radar cross section data from a plurality of N-point sliding windows may be collected and STD values determined.

The radar processor causes this process to be repeated until the predetermined minimum number of standard deviations values, StdWinSize have been computed. As noted, the value of StdWinSize may be set based empirical analysis over a representative set of trials. In an embodiment, a StdWinSize value of 9 may be used.

Once the predetermined minimum number of standard deviations values have been computed, processing flows to block 525. At block 525, a determination is made as to how many of the standard deviations are below a threshold standard deviation value. In an embodiment, the threshold standard deviation value may be represented by StdThresh, and the number of the collected standard deviation values that are below StdThresh may be represented by NumBelow. FIG. 4 depicts an example graphical illustration of RCS standard deviation over time with a threshold standard deviation value (StdThresh) of 1.5 dBsm.

At block 530, a determination is made as to whether the NumBelow number of standard deviation values that are below the predetermined StdThresh value is greater than a predetermined number of values or points, which may be represented as NumThresh, that are needed to increment a counter. Responsive to a determination that NumBelow value is less than the predetermined NumThresh value, the process flows along path 535 back to block 515, where the radar processor slides the window to collect return signals corresponding to the object over a N-point window, extracts the radar cross section data from the return signals, and computes a standard deviation for the window. The process then proceeds to block 520, where standard deviation measurements are collected until a threshold number of standard deviation measurements, StdWinSize, have been received. Then, as previously described, at block 525, a determination is made as to how many (NumBelow) of the standard deviations are below a threshold standard deviation value StdThresh, and then at block 530 another determination is made as to whether the NumBelow number of standard deviation values that are below the predetermined StdThresh value is greater than a predetermined number of values or points NumThresh, that are needed to increment a counter. If the NumBelow value is greater than the NumThresh value, the process loop of block 530 via path 535 to blocks 515, 520, 525, and back to block 530, continues until the NumBelow value is greater than the NumThresh value or until the end of the RCS measurement sequence is reached at which point the processing terminates.

The various thresholds and predetermined values of the process, such as StdThresh and NumThresh, are configurable, and may be selected to account for whatever combination of target sizes, dynamics, and expected viewing geometries are expected. For example, a lower StdThresh value may be appropriate when the complex target is expected to have lower RCS standard deviation values (which are still higher than the RCS standard deviation values of the target decoys), while a higher StdThresh value may be appropriate when the complex target is expected to have higher RCS standard deviation values because of, for example, either the nature of the target or the RCS measurement accuracy of the radar. Similarly, a lower NumThresh value may be appropriate for a radar with poor RCS measurement accuracy where the likelihood of RCS standard points deviation falling above StdThresh may be high for a sphere. Conversely, a higher NumThresh value may be appropriate for a radar with high RCS measurement accuracy where the likelihood of RCS standard points deviation falling above StdThresh is low for a sphere. Furthermore, as noted, a trade off of SPIF process parameters may be made to optimize sphere declaration performance with false-positive declaration on true complex targets.

Once a determination is made at block 530 that the NumBelow value is greater than the NumThresh value, the process proceeds to block 545 via path 540. At block 545, a counter is incremented. The counter may be represented by StdCount. Each incrementing of StdCount represents a determination that enough (NumThresh) standard deviation values were below a predetermined StdThresh value to make an initial inference that the object is a sphere.

Figure 6:
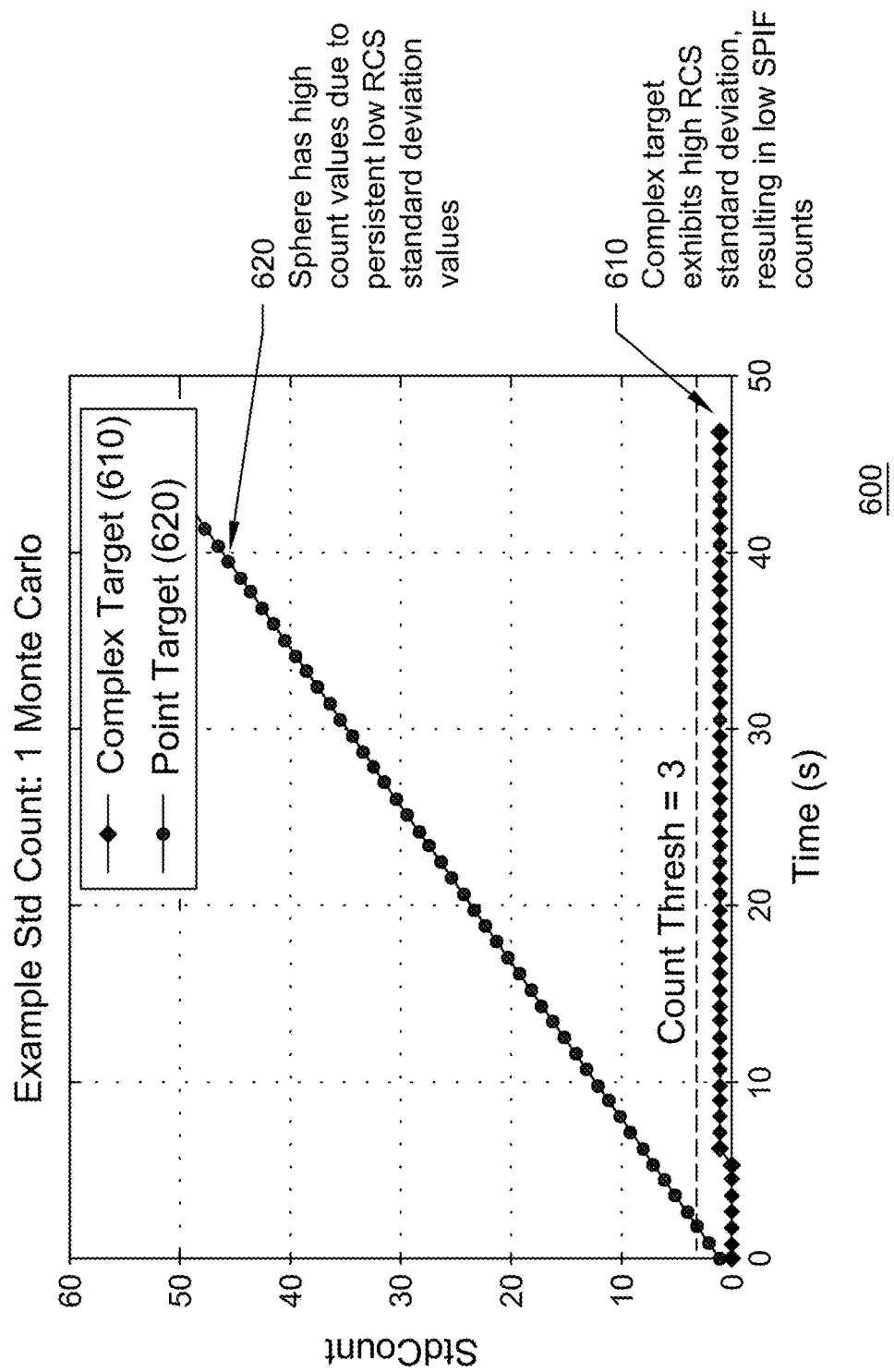
FIG. 6 is a graphical illustration of the intermediate result of the Sphere Indicator Function (SPIF) process for sample spherical and non-spherical objects.

However, a final determination that an object is a sphere is not made until the increment value has reached a predetermined threshold counter value CountThresh, which may be a threshold value used to ensure that, for example, a single false positive observation is not used to identify the object as a sphere. Thus, the process continues to block 550, where a determination is made as to whether the value of the counter, StdCount, is greater than a predetermined threshold value CountThresh, by comparing the values. In an embodiment, CountThresh may typically set to a value greater than one, so that more than a single observation of a set number of standard deviations below a certain value (StdThresh) is required to identify an object as a sphere. For example, radars with lower RCS measurement accuracy could exhibit high RCS fluctuation even for spherical objects, increasing the likelihood of false positives. As a result, a high value of CountThresh would be desired. Conversely, a radar with high RCS measurement accuracy would decrease the likelihood of false positives and thus a smaller value of CountThresh could be tolerated. In an embodiment, and as shown in FIG. 6, a value of 3 might be used for CountThresh to balance the need to avoid false positives with the need to quickly identify spheres.

Responsive to a determination that the counter value (StdCount) is less than the predetermined counter threshold value (CountThresh) at block 550, the process proceeds via path 555 back to block 515 so that additional radar returns may be received and processed. The radar processor slides the window to collect return signals corresponding to the object over a N-point window, extracts the radar cross section data from the return signals, and computes a standard deviation for the window. The process then proceeds to block 520, where standard deviation measurements are collected until a threshold number of standard deviation measurements, StdWinSize, have been received. Then, as previously described, at block 525, a determination is made as to how many (NumBelow) of the standard deviations are below a threshold standard deviation value StdThresh, and then at block 530 another determination is made as to whether the NumBelow number of standard deviation values that are below the predetermined StdThresh value is greater than a predetermined number of values or points NumThresh, that are needed to increment a counter. If the NumBelow value is less than the NumThresh value, the process loop of block 530 via path 535 to blocks 515 and 520 where a new non-overlapping window of length StdWinSize is collected, and then to block 525, and back to block 530, continues. Then, once a determination is made at block 530 that the NumBelow value is greater than the NumThresh value, the process proceeds to block 545 via path 540. At block 545, the counter is incremented, and then processing proceeds to block 550 where another determination is made as to whether the value of the counter, StdCount, is greater than a predetermined threshold value CountThresh, by comparing the values. If the counter value StdCount is less than the desired threshold value CountThresh, the process loop of block 550 via path 555 to blocks 515, 520, 525, and 530, continues until the counter value StdCount, is greater than a predetermined threshold value CountThresh, or the end of the sequence of measurements is reached.

Responsive to a determination that the counter value (StdCount) is greater than the predetermined counter threshold value (CountThresh) at block 550, the process flows via path 560 to block 565. At block 565, a determination is made that the object is a sphere, and an output of that determination may be made. In an embodiment, an SPIF counter which counts the number of sphere detections made may be incremented each time a sphere is identified. The embodiment of FIG. 5 depicts that the SPIF counter "Set SPIF=1" is incremented when a sphere is identified.

The process of FIG. 5 is configurable through the five parameters shown in FIG. 5 (101-104, 106): N, StdWinSize, StdThresh, NumThresh, and CountThresh. For example, various types of spheres may have lower or higher RCS standard deviations than the examples provided herein, therefore different parameter values may be selected to optimize the process for the particular type of spheres being encountered. Similarly, the true targets of interest may exhibit lower or higher RCS standard deviations than the complex target example in FIG. 4. The configurable process parameters permit the process to be optimized and adapted to whatever combination of target sizes, dynamics, and viewing geometries are expected or encountered. In addition, a trade off of SPIF process parameters can be performed to optimize sphere declaration performance with false-positive declaration on true complex targets.

For example, FIG. 4 shows the resultant STD values over time for the RCS sequences given in FIG. 3 given a value of N=20. Once a minimum number of STD measurements, StdWinSize 102, is collected, the number of measurements below a threshold, StdThresh, is recorded as NumBelow 103. Spherical objects will generally have a high number of RCS standard deviation points below this threshold given their constant RCS response to the incident transmitted signal. In the example shown in FIG. 4, StdWinSize is set to 9 and StdThresh is set to 1.5 dBsm. If NumBelow is greater than a threshold of points, NumThresh 104, a counter, StdCount 105 is incremented. This process is repeated over series of non-overlapping windows. Spherical objects will have StdCount values that increase monotonically over time as shown in FIG. 6; the more track history available, the higher the StdCount values will accumulate. Finally, if this counter is greater than a threshold, CountThresh 106, SPIF positively declares the track to be a spherical object due to the observation of consistent, persistent low RCS standard deviation.

FIG. 6 is a graphical illustration 600 of results from the SPIF process of FIG. 5 for a Monte Carlo simulation of spherical and non-spherical dynamic objects. FIG. 6 depicts the value of counter 545 of FIG. 5, StdCount, versus time, for a spherical object (line 620) and a non-spherical complex object (Line 610). As noted in relation to FIG. 5, each StdCount count increment represents a determination that a predetermined number of standard deviations (NumBelow) below a threshold value (StdThresh) have been observed that is greater than a threshold amount (NumThresh), which is typically indicative of the observed object being a sphere. In order to reduce false positives, the process may require a StdCount value higher than one (1) before a determination is made that an object is a sphere. FIG. 6 depicts a process in which a StdCount value of three (3) is required (CountThresh=3) before the determination in step 565 of FIG. 5 is made that the object is a sphere. Line 610 corresponds to the StdCount for a complex target, which, in the example of FIG. 6, is below the CountThresh of 3 because, as shown in FIGS. 3 and 4, a complex target has large RCS variation and high values of RCS standard deviation over time. Line 620 corresponds to the StdCount for a spherical object, which increases over time over the CountThresh threshold because, as shown in FIGS. 3 and 4, spherical objects have minimal RCS variation and low values of RCS standard deviation over time. The spherical objects will have StdCount values that increase monotonically over time, and the more track history available, the higher the StdCount values will accumulate. As shown in the example of FIG. 6, a spherical object may be detected or identified within 2-3 seconds according to the SPIF process.

Figure 7:
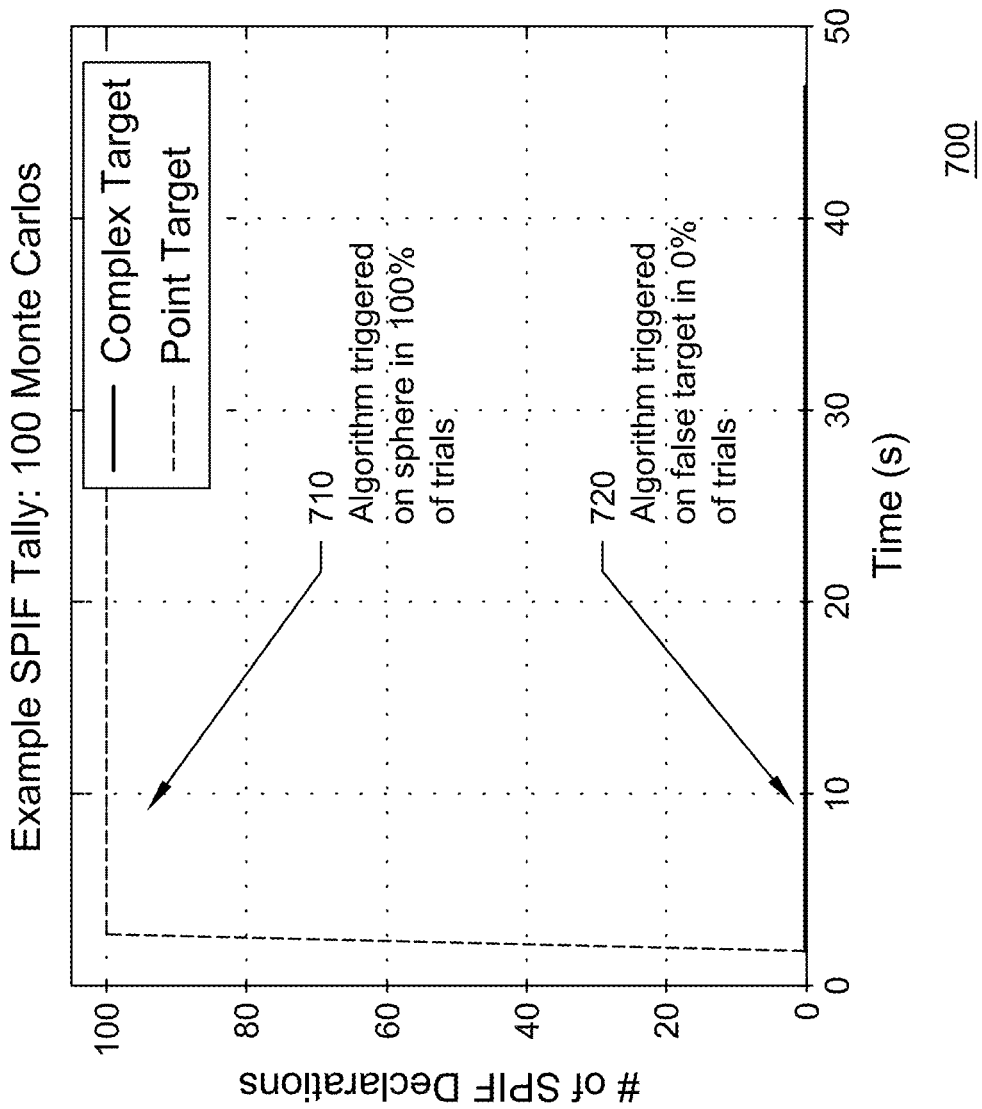
FIG. 7 is a graphical illustration of the Sphere Indicator Function (SPIF) process results for a Monte Carlo simulation of spherical and non-spherical dynamic objects.

FIG. 7 depicts a graph 700 of the results of 100 Monte Carlo simulations of a complex (line 720) and spherical target (line 710). In all 100 instantiations, the SPIF process correctly declared the spherical object as a sphere in 100% of the trials, with no false declarations on the complex target. The number of SPIF Declarations reflected in the graph comprises the number of spheres out of the 100. Monte Carlo trials identified by the process of FIG. 5, as shown in block 565.

Figure 8:
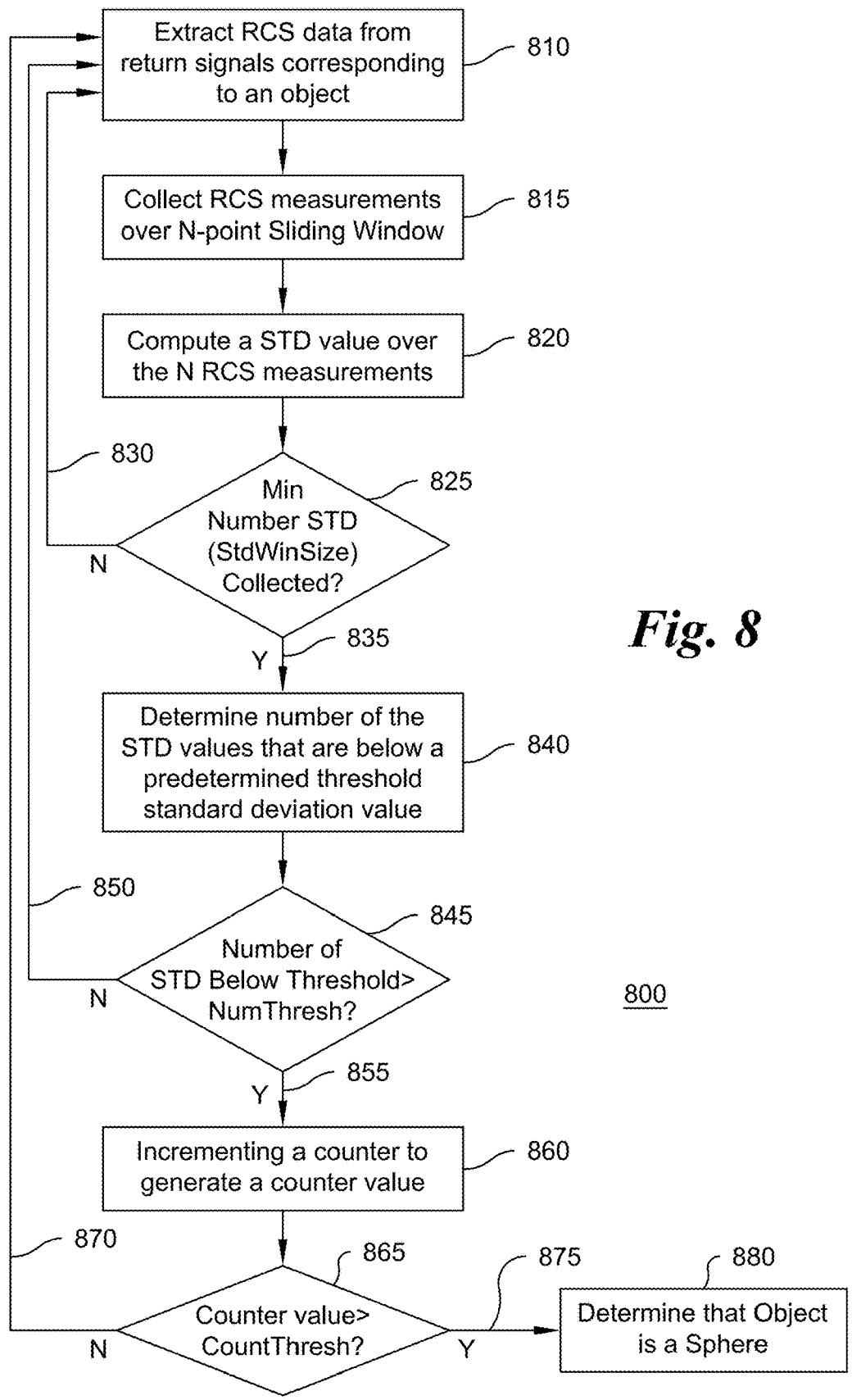
FIG. 8 is a process flow diagram illustrating a Sphere Indicator Function (SPIF) process according to an embodiment of the present disclosure.

FIG. 8 depicts another embodiment of a SPIF process flow 800 which receives sequences of RCS measurements for a given track to identify spherical objects according to the present disclosure. At block 810, RCS data is extracted from return signals corresponding to an object. At block 815, RCS measurements are collected over an N-point sliding window from the received return signals of block 810. At block 820, a standard deviation value (STD) is computed over the N RCS measurements based on the return signals corresponding to the N-point sliding window. At block 825, a determination is made as to whether a predetermined minimum number of standard deviations values (STDs) for non-overlapping windows have been computed.

Responsive to a determination that the predetermined minimum number of standard deviation values have not been computed, the process continues on path 830 back to block 810, where the radar processor slides the window to collect and extract RCS data from return signals corresponding to the object over another N-point window. Then the process proceeds to blocks 815, 820, and 825 until the predetermined minimum number of standard deviations values have been computed.

Responsive to a determination in block 825 that the predetermined minimum number of standard deviation values have been computed, the process continues on path 835 to block 840. At block 840, a determination is made as to the number of the standard deviation values that are below a predetermined threshold standard deviation value. In an embodiment, the predetermined threshold standard deviation value may be represented by StdThresh and the number of standard deviations that are below the StdThresh value may be represented by NumBelow. At block 845, a determination is made as to whether the number of standard deviations below (NumBelow) the predetermined threshold STD value (StdThresh) is greater than another predetermined threshold value, which may be represented by NumThresh. NumThresh is a value representative of the number of NumBelow values necessary to increment a counter. Thus, at block 845, the NumBelow value is compared to the NumThresh value.

Responsive to a determination that the NumBelow value is less than the predetermined NumThresh value, no evidence that the current object is spherical has been obtained from the current non-overlapping window of RCS Standard Deviation values. Thus, if the NumBelow value is less than the NumThresh value, processing continues on path 850 back to block 810, and blocks 810 through 845 are repeated to collect the next non-overlapping window of RCS Standard Deviation values to assess if the NumBelow value is greater than the predetermined NumThresh value. Responsive to a determination that NumBelow value is greater than the predetermined NumThresh value, processing continues on path 855 to block 860. At block 860, a counter is incremented. The counter may be represented by StdCount. Incrementing of the counter indicates that data has been obtained from the current window of RCS standard deviation values that suggests that the object is a sphere. However, before a final determination is made that the object is a sphere, in embodiments, it may be desirable to require more than a single incrementing of the counter to make the determination, to eliminate the possibility of false positive detections. Thus, before the object is determined to be a sphere, the process continues to block 865, where a comparison is made between the counter value (StdCount) and a predetermined counter value (CountThresh) that is required to make a sphere identification.

Responsive to a determination that the counter value (StdCount) is less than the predetermined counter threshold value (CountThresh), processing continues on path 870 back to block 810, and blocks 810 through 865 are repeated until the StdCount value is greater than the predetermined CountThresh value, or the end of the RCS measurement sequence is reached. Responsive to a determination that the counter value StdCount is greater than the predetermined counter threshold value CountThresh, processing continues on path 875 to block 880 where a determination that the object being tracked is a sphere may be output. In an embodiment, the identification of the object as a sphere may cause a SPIF counter to increment so that the number of sphere's identified may be counted.

Like the process of FIG. 5, the process of FIG. 8 is configurable through the five parameters shown in FIG. 5 (101-104, 106): N, StdWinSize, StdThresh, NumThresh, and CountThresh. The configurable process parameters permit the process to be optimized and adapted to whatever combination of target sizes, dynamics, and viewing geometries are expected or encountered. In addition, a trade off of SPIF process parameters can be performed to optimize sphere declaration performance with false-positive declaration on true complex targets.

In an embodiment, the processes of FIGS. 5 and 8 may be performed by a system such as depicted in FIG. 1. In an embodiment, the system may comprise a radar antenna for transmitting signals to, and receiving signals from, an object being tracked, one or more data storage devices for storing the sensor measurements, one or more computer processors in communication with the one or more data storage devices, and a memory for storing program instructions which are configured to cause the one or more computer processors to effect the SPIF process in accordance with the process of FIG. 5 or 8.

Alternatives to the processes depicted in FIGS. 5 and 8 may also to be used to implement the SPIF process without departing from the spirit of the invention. For example, in an embodiment, the SPIF process could be implemented by simply counting the number of standard deviation values that are below a threshold value, and if there are a sufficient number of standard deviation values below the threshold value, a determination may be made that the object is a sphere.

In an embodiment, a computer-implemented method may process radar return signals to identify spherical objects from within a cluster of objects. The method may collect, by a radar receiver, a plurality of radar return signals over N-point sliding windows corresponding to objects within the cluster of objects. The radar return signals may correspond to electronic pulses transmitted by a radar transmitter. The radar processor extracts radar cross section data from the collected plurality of radar return signals, and computes, based on the radar cross section data, a plurality of standard deviation values, each standard deviation value based on the radar cross section data corresponding to one of the N-point sliding windows. The radar processor determines, based on analysis of the standard deviation values of the return signals, whether the object is a spherical object.

In an embodiment, determining based on analysis of the standard deviation values of the return signals, whether the object is a spherical object comprises determining whether at least a pre-determined number of the standard deviation values of the return signals are below a predetermined standard deviation threshold value. The predetermined standard deviation threshold value may be 1.5 dBsm. Determining whether a pre-determined number of the standard deviation values of the return signals are below the predetermined standard deviation threshold value may comprise determining a number of the standard deviation values that are below the predetermined standard deviation threshold value; comparing the number of the standard deviation values that are below the predetermined standard deviation threshold value to a predetermined desired number of standard deviation values below the predetermined standard deviation threshold value; and responsive to a determination that the number of the standard deviation values that are below the predetermined standard deviation threshold value is greater than the predetermined desired number of standard deviation values, providing evidence that the object is a spherical object.

In an embodiment, comparing the number of the standard deviation values that are below a predetermined standard deviation threshold value to a predetermined desired number of standard deviation values below the predetermined standard deviation threshold value may comprise: comparing the number of the standard deviation values that are below the predetermined standard deviation threshold value to a predetermined desired number of standard deviation values below the predetermined standard deviation threshold value; responsive to a determination that the number of the standard deviation values that are below the predetermined standard deviation threshold value is greater than the predetermined desired number of standard deviation values, incrementing a counter; comparing the counter value to a predetermined counter threshold; and responsive to a determination that counter value is greater than the predetermined counter threshold, determining that the object is a spherical object. IN embodiments, the predetermined counter threshold may be 3. The predetermined desired number of standard deviation values NumThresh may be 5 based on empirical analysis.

The processing system 100 of FIG. 1 is described and illustrated herein only as exemplary systems for performing the described sphere indicator function process to identify spherical objects, and other embodiments may be contemplated by one of skill in the pertinent art without departing from the intended scope of this disclosure. More generally, the process or processes explained herein may be computer-implemented methods performed by one or more processors, which processors access a memory device, the memory device containing instructions, which instructions, when executed by the processors, cause the steps of a method for receiving radar return signals and determining whether the objects reflected in the signals are spherical objects such as traffic decoys. It is understood that the processes may also be performed by special-purpose hardware, such as, but not limited to special purpose tracking/tracker computers with special purpose tracking/tracker computer processors and related hardware. Thus, the entire process, or any part thereof, may be performed in hardware, software or any combination of hardware and/or software. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A computerized radar system for processing a plurality of radar return signals to identify spherical objects from within a cluster of objects, comprising:
a radar receiver for receiving the plurality of radar return signals corresponding to electromagnetic pulses transmitted by a radar transmitter; and
a radar processor coupled to the radar transmitter and the radar receiver and configured to:
collect the plurality of radar return signals corresponding to an object within the cluster of objects;
extract radar cross section data from the collected plurality of radar return signals over a plurality of N-point sliding windows;
compute, based on the radar cross section data, a plurality of standard deviation values, each standard deviation value based on the radar cross section data corresponding to one of the plurality of N-point sliding windows; and
determine, based on analysis of the plurality of standard deviation values of the plurality of radar return signals, whether the object is a spherical object.

2. The computerized radar system of claim 1, wherein the radar processor is configured to determine, based on analysis of the plurality of standard deviation values of the plurality of radar return signals, whether the object is a spherical object by determining whether at least a pre-determined number of the plurality of standard deviation values of the plurality of radar return signals are below a predetermined standard deviation threshold value.

3. The computerized radar system of claim 2, wherein the predetermined standard deviation threshold value is 1.5 dBsm.

4. The computerized radar system of claim 2, wherein the radar processor is configured to determine whether a pre-determined number of the plurality of standard deviation values of the plurality of radar return signals are below the predetermined standard deviation threshold value by:
determining a number of the plurality of standard deviation values that are below the predetermined standard deviation threshold value;
comparing the number of the plurality of standard deviation values that are below the predetermined standard deviation threshold value to a predetermined desired number of standard deviation values below the predetermined standard deviation threshold value; and
responsive to a determination that the number of the plurality of standard deviation values that are below the predetermined standard deviation threshold value is greater than the predetermined desired number of standard deviation values, determining that the object is a spherical object.

5. The computerized radar system of claim 4, wherein the radar processor is configured to compare the number of the plurality of standard deviation values that are below the predetermined standard deviation threshold value to the predetermined desired number of standard deviation values below the predetermined standard deviation threshold value by:
comparing the number of the plurality of standard deviation values that are below the predetermined standard deviation threshold value to the predetermined desired number of standard deviation values below the predetermined standard deviation threshold value;
responsive to a determination that the number of the plurality of standard deviation values that are below the predetermined standard deviation threshold value is greater than the predetermined desired number of standard deviation values, incrementing a counter value;
comparing the counter value to a predetermined threshold counter value;

responsive to a determination that the counter value is greater than the predetermined threshold counter value, determining that the object is a spherical object.

6. The computerized radar system of claim 5, wherein the predetermined threshold counter value is 3.

7. The computerized radar system of claim 5, wherein the predetermined standard deviation threshold value is 1.5 dBsm.

8. The computerized radar system of claim 5, wherein the predetermined desired number of standard deviation values is 5.

9. A computer-implemented method for processing a plurality of radar return signals to identify spherical objects from within a cluster of objects, comprising:
   collecting, by a radar receiver, the plurality of radar return signals corresponding to an object within the cluster of objects, the radar return signals corresponding to electromagnetic pulses transmitted by a radar transmitter;
   extracting, by a radar processor, radar cross section data from the collected plurality of radar return signals over a plurality of N-point sliding windows;
   computing, by the radar processor based on the radar cross section data, a plurality of standard deviation values, each standard deviation value based on the radar cross section data corresponding to one of the plurality of N-point sliding windows; and
   determining, by the radar processor based on analysis of the plurality of standard deviation values of the plurality of radar return signals, whether the object is a spherical object.

10. The computer-implemented method of claim 9, wherein determining whether the object is a spherical object based on analysis of the plurality of standard deviation values of the plurality of radar return signals comprises determining whether at least a pre-determined number of the plurality of standard deviation values of the plurality of radar return signals are below a predetermined standard deviation threshold value.

11. The computer-implemented method of claim 10, wherein the predetermined standard deviation threshold value is 1.5 dBsm.

12. The computer-implemented method of claim 10, wherein determining whether a pre-determined number of the plurality of standard deviation values of the plurality of radar return signals are below the predetermined standard deviation threshold value comprises:
   determining a number of the plurality of standard deviation values that are below the predetermined standard deviation threshold value; and
   comparing the number of the plurality of standard deviation values that are below the predetermined standard deviation threshold value to a predetermined desired number of standard deviation values below the predetermined standard deviation threshold value; and
wherein the computer-implemented method further comprises:
   responsive to a determination that the number of the plurality of standard deviation values that are below the predetermined standard deviation threshold value is greater than the predetermined desired number of standard deviation values, determining that the object is a spherical object.

13. The computer-implemented method of claim 12, wherein comparing the number of the plurality of standard deviation values that are below the predetermined standard deviation threshold value to the predetermined desired number of standard deviation values below the predetermined standard deviation threshold value comprises:
   comparing the number of the plurality of standard deviation values that are below the predetermined standard deviation threshold value to the predetermined desired number of standard deviation values below the predetermined standard deviation threshold value;
   responsive to a determination that the number of the plurality of standard deviation values that are below the predetermined standard deviation threshold value is greater than the predetermined desired number of standard deviation values, incrementing a counter value;
   comparing the counter value to a predetermined counter threshold; and
wherein the computer-implemented method further comprises:
   responsive to a determination that the counter value is greater than the predetermined counter threshold, determining that the object is a spherical object.

14. The computer-implemented method of claim 13, wherein the predetermined counter threshold is 3.

15. The computer-implemented method of claim 13, wherein the predetermined standard deviation threshold value is 1.5 dBsm.

16. The computer-implemented method of claim 13, wherein the predetermined desired number of standard deviation values is 5.

17. A computer-implemented method for detecting and identifying spherical objects from within a cluster of objects, comprising:
   (a) transmitting, by a transmitter, electromagnetic pulses to track an object;
   (b) receiving, by a receiver, a plurality of return signals corresponding to the electromagnetic pulses and extracting radar cross section (RCS) measurements from the plurality of received return signals;
   (c) computing, by a radar processor, a predetermined number of RCS standard deviation values from N-point sliding windows corresponding to the plurality of return signals;
   (d) determining, by the radar processor, a number of the RCS standard deviation values that are below a predetermined standard deviation threshold value in a non-overlapping window of predetermined size;
   (e) comparing, by the radar processor, the number of the RCS standard deviation values that are below the predetermined standard deviation threshold value to a predetermined desired number of standard deviation values below the predetermined standard deviation threshold value;
   (f) responsive to a determination that the number of the RCS standard deviation values that are below the predetermined standard deviation threshold value is less than the predetermined desired number of standard deviation values below the predetermined standard deviation threshold value, repeating, by the radar processor, steps (a) through (e) until the number of the RCS standard deviation values that are below the predetermined standard deviation threshold value is greater than the predetermined desired number of standard deviation values below the predetermined standard deviation threshold value;
   (g) responsive to a determination that the number of the RCS standard deviation values that are below the predetermined standard deviation threshold value is greater than the predetermined desired number of standard deviation values below the predetermined standard deviation threshold value, (h) incrementing, by the radar processor, a counter to generate a counter value;

(i) comparing, by the radar processor, the counter value to a predetermined threshold counter value;

(j) responsive to a determination that the counter value is less than the predetermined threshold counter value, repeating, by the radar processor, steps (a) through (i) until the counter value is greater than the predetermined threshold counter value; and (k) responsive to a determination that the counter value is greater than the predetermined threshold counter value, outputting, by the radar processor, a determination that the object being tracked is a spherical object.

18. The computer-implemented method of claim 17, wherein computing, by the radar processor, the predetermined number of RCS standard deviation values from the N-point sliding windows corresponding to the plurality of return signals, comprises:

(l) collecting the plurality of return signals corresponding to the object;

(m) extracting radar cross section data from the plurality of received return signals over the N-point sliding windows;

(n) computing a standard deviation value based on the plurality of radar return signals corresponding to the N-point sliding windows;

(o) determining whether a predetermined minimum number of standard deviations values have been computed; and (p) responsive to a determination that the predetermined minimum number of standard deviation values have not been computed, repeating steps (l) through (o) until the predetermined minimum number of standard deviations values have been computed.

19. The computer-implemented method of claim 18, wherein the N-point sliding windows comprises a twenty-point sliding window.

20. The computer-implemented method of claim 17, wherein the non-overlapping window of predetermined size comprises a window of nine standard deviation values.

\* \* \* \* \*